United States Patent
Kamada et al.

(10) Patent No.: US 9,284,720 B2
(45) Date of Patent: Mar. 15, 2016

(54) GUIDANCE OUTPUT DEVICE AND GUIDANCE OUTPUT METHOD

(75) Inventors: Seiji Kamada, Kanagawa (JP); Kentarou Tajima, Kanagawa (JP)

(73) Assignee: KOMATSU LTD., Tokyo (JP)

( * ) Notice: Subject to any disclaimer, the term of this patent is extended or adjusted under 35 U.S.C. 154(b) by 197 days.

(21) Appl. No.: 13/582,751

(22) PCT Filed: Sep. 5, 2011

(86) PCT No.: PCT/JP2011/070171
§ 371 (c)(1),
(2), (4) Date: Sep. 5, 2012

(87) PCT Pub. No.: WO2012/043159
PCT Pub. Date: Apr. 5, 2012

(65) Prior Publication Data
US 2012/0330500 A1    Dec. 27, 2012

(30) Foreign Application Priority Data

Sep. 30, 2010 (JP) ................. 2010-220135

(51) Int. Cl.
*E02F 9/26* (2006.01)
*B60W 50/02* (2012.01)
*B60W 50/04* (2006.01)
*G05B 23/02* (2006.01)
*E02F 9/22* (2006.01)

(52) U.S. Cl.
CPC ................ *E02F 9/268* (2013.01); *B60W 50/02* (2013.01); *B60W 50/04* (2013.01); *E02F 9/2285* (2013.01); *E02F 9/2296* (2013.01); *G05B 23/0283* (2013.01); *B60W 2050/021* (2013.01)

(58) Field of Classification Search
CPC ....... E02F 9/268; E02F 9/2296; E02F 9/2285; B60W 50/04; B60W 50/02; B60W 2050/021; G05B 23/0283
See application file for complete search history.

(56) References Cited

U.S. PATENT DOCUMENTS

| | | | |
|---|---|---|---|
| 4,647,902 A * | 3/1987 | Teshima et al. | 340/439 |
| 5,652,378 A * | 7/1997 | Dussault | 73/114.52 |
| 7,751,954 B2 | 7/2010 | Matsuda et al. | |
| 2002/0038172 A1* | 3/2002 | Kinugawa | 701/50 |

(Continued)

FOREIGN PATENT DOCUMENTS

| | | |
|---|---|---|
| DE | 11 2004 001 554 T5 | 6/2006 |
| EP | 10 2004 039 841 A1 | 4/2005 |
| JP | 2002-285890 A | 10/2002 |
| JP | 2005-98076 A | 4/2005 |
| JP | 2005-98988 A | 4/2005 |
| JP | 2009-235716 A | 10/2009 |
| WO | 2005/024209 A1 | 3/2005 |
| WO | 2009/011630 A1 | 1/2009 |

OTHER PUBLICATIONS

The International Search Report mailed on Dec. 6, 2011 for the corresponding International patent application No. PCT/JP2011/070171 (English translation attached).

*Primary Examiner* — Rami Khatib
*Assistant Examiner* — Jeffrey Boomer
(74) *Attorney, Agent, or Firm* — Posz Law Group, PLC

(57) ABSTRACT

There are included an eco guidance determination unit that detects the occurrence of fuel-wasting operation during operation of a construction machine, and a guidance display control unit that stores guidance for energy saving corresponding to energy wasting operation; that, when fuel-wasting operation occurs, displays corresponding guidance for energy saving; and that also displays the corresponding guidance for energy saving at a predetermined timing after occurrence of the energy wasting operation.

12 Claims, 11 Drawing Sheets

(56) References Cited

U.S. PATENT DOCUMENTS

| | | | |
|---|---|---|---|
| 2004/0148084 A1* | 7/2004 | Minami | 701/55 |
| 2005/0021222 A1* | 1/2005 | Minami et al. | 701/123 |
| 2005/0027433 A1* | 2/2005 | Panciroli | 701/111 |
| 2005/0150142 A1* | 7/2005 | Matsuda et al. | 37/414 |
| 2006/0287841 A1* | 12/2006 | Hoshi et al. | 702/182 |
| 2008/0249679 A1* | 10/2008 | Matsuda et al. | 701/31 |
| 2010/0198466 A1* | 8/2010 | Eklund et al. | 701/50 |
| 2011/0056185 A1* | 3/2011 | Bradley et al. | 60/274 |
| 2011/0208378 A1* | 8/2011 | Krueger et al. | 701/22 |
| 2013/0058750 A1* | 3/2013 | Hiroki et al. | 414/744.2 |

* cited by examiner simplified schematic figure of entire construction machine

1: lower traveling unit portion
2: pivot mechanism
3: upper pivoting body portion
4: working mechanism
5: boom
6: arm
7: bucket
11: operator compartment

FIG. 2 perspective view of principal portions of construction machine

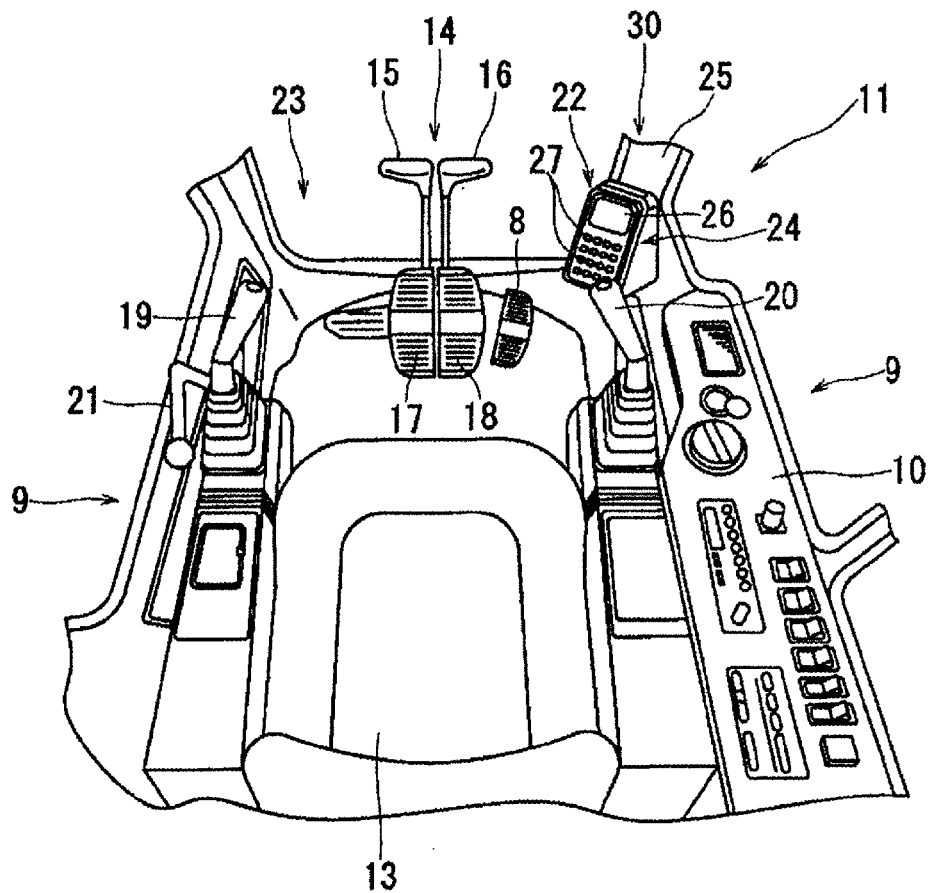

8: attachment pedal
9: side window
10: instrument panel
11: operator compartment
13: operator's seat
14: traveling actuation means
15: traveling lever
16: traveling lever
17: traveling pedal
18: traveling pedal 19: working mechanism actuation lever
20: working mechanism actuation lever
21: lock lever
22: monitor device
23: front window
24: external casing
25: vertical frame
26: monitor screen
27: pushbutton
30: display means

FIG. 3 simplified schematic figure showing control system of construction machine

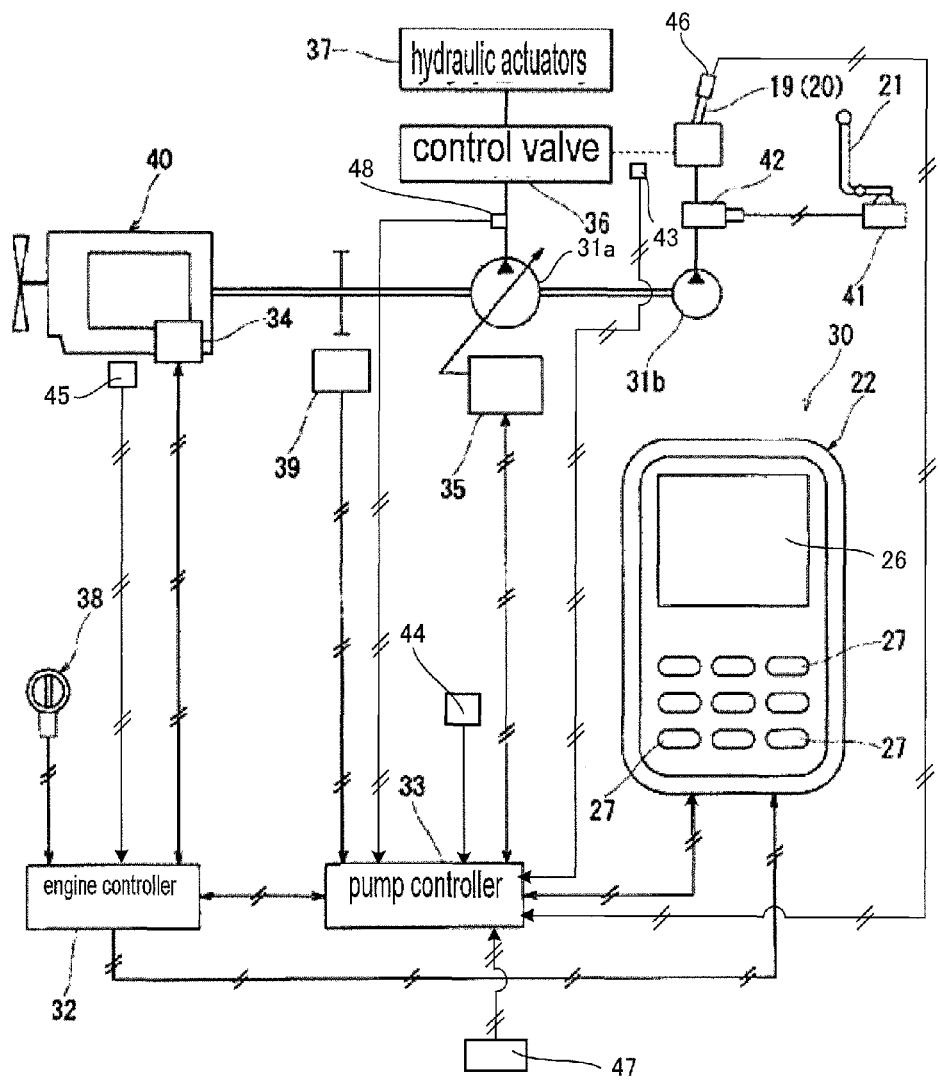

19: working mechanism lever
20: working mechanism lever
21: lock lever
22: monitor device
26: monitor screen
27: pushbutton
30: display means
31a: hydraulic pressure pump
31b: hydraulic pressure pump 32: engine controller
33: pump controller
34: governor motor
35: sloping plate drive device
36: control valve
37: actuator
38: combustion dial
39: rotation sensor
40: engine 41: lock switch
42: solenoid valve
43: pressure sensor
44: working hydraulic fluid temperature sensor
45: engine water temperature sensor
46: knob switch
47: pivoting lock switch
48: pressure sensor FIG. 5A
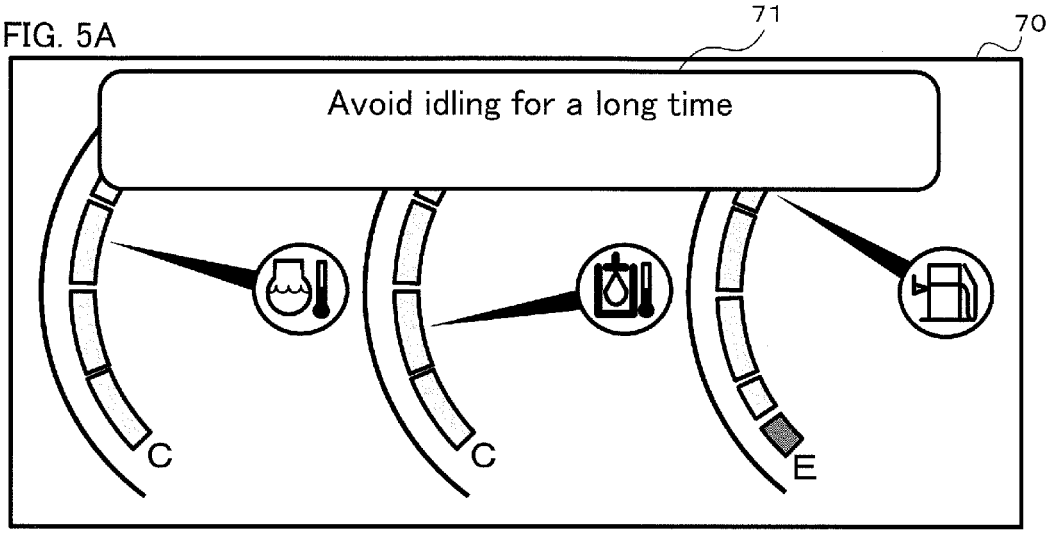
FIG. 5B
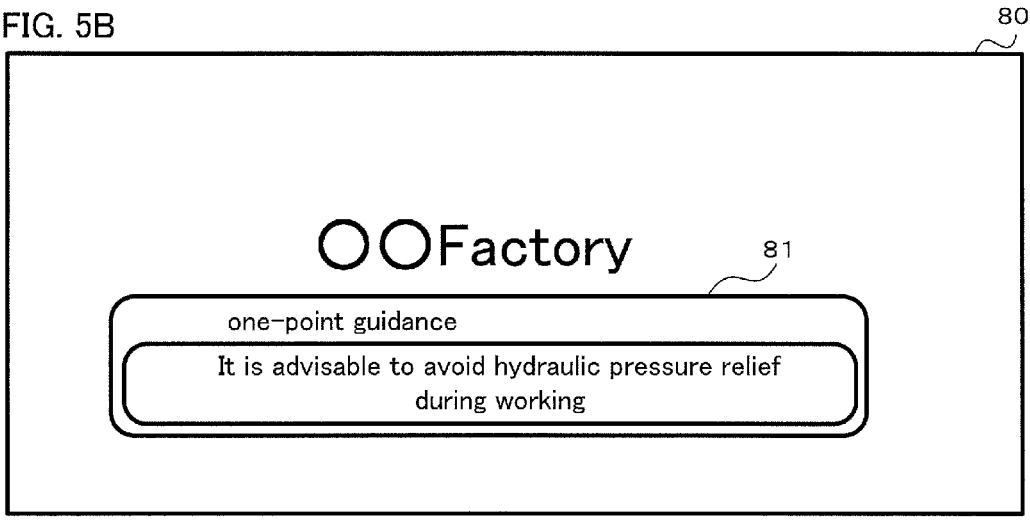
FIG. 5C
| eco guidance record (one day) | (number of times) |
|---|---|
| idling for a long time | 2 |
| hydraulic pressure relief | 3 |
| E mode recommended | 1 |
one-point guidance
It is advisable to avoid hydraulic pressure relief during working

FIG. 6

| type of fuel consumption deteriorated operation item name | conditions | guidance | | priority order |
|---|---|---|---|---|
| | | eco guidance | one-point guidance | |
| idling for a long time | no actuation<br>continued for predetermined time interval | Avoid idling for a long time | Diligently stopping engine operation during idling keeps fuel consumption down | 1 |
| hydraulic pressure relief | not warming up operation<br>pump pressure greater than or equal to hydraulic pressure relief pressure<br>continued for predetermined time interval | Try to avoid hydraulic pressure relief | It is advisable to avoid hydraulic pressure relief during working | 4 |
| E mode recommended | not E mode<br>horsepower being generated within E mode range | The use of E mode is recommended. | Fuel consumption is kept down by using E mode | 2 |
| partially open throttle traveling recommended | traveling operation<br>throttle command greater than or equal to predetermined amount<br>continued for predetermined time interval | Keeping throttle opening low when traveling a long way is most economical | Keeping throttle opening low when traveling a long way is most economical | 3 |

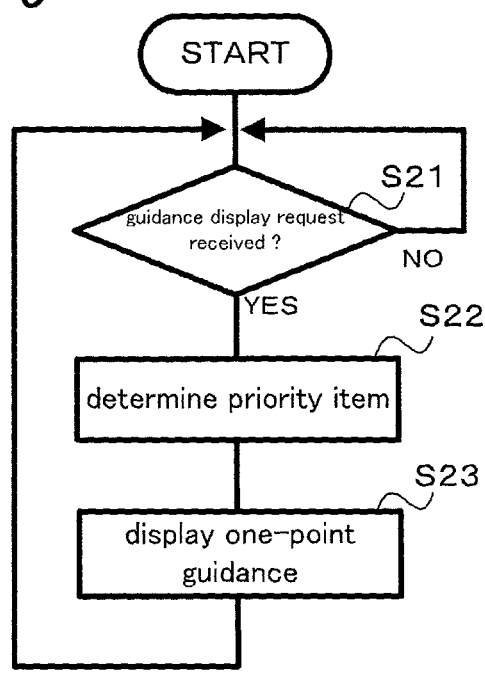

P mode

E mode

GUIDANCE OUTPUT DEVICE AND GUIDANCE OUTPUT METHOD

CROSS REFERENCE TO RELATED APPLICATIONS

This application is a U.S. national stage application of PCT/JP2011/070171 filed on Sep. 5, 2011, and claims priority to, and incorporates by reference, Japanese Patent Application No. 2010-220135 filed on Sep. 30, 2010.

TECHNICAL FIELD

The present invention relates to a guidance output device that outputs energy saving guidance for a construction machine such as a hydraulic shovel, a wheel loader, a bulldozer, or the like.

BACKGROUND ART

In a construction machine, it is practiced to detect the states of various parameters such as the temperature of the cooling water, the remaining amount of fuel, the temperature of the working hydraulic fluid, and so on, and to display these upon a monitor device. In recent years, it has become required to implement energy saving for a construction machine; for example, it has become required to reduce the amount of fuel consumed. In order to cope with this type of requirement, a technique for displaying the difference between a fuel consumption ratio that is to be targeted and the actual fuel consumption ratio, thus notifying this difference to the operator, and a technique for providing a display to recommend the improvement of fuel consumption when the fuel consumption ratio exceeds a set target value, are known (for example, refer to Patent Document #1).

PRIOR ART DOCUMENTS

Patent Literature

Patent Document #1: Japanese Laid-Open Patent Publication 2005-98988.

SUMMARY OF THE INVENTION

Problem to be Solved by the Invention

According to the technique of Patent Document #1 described above, the operator of the construction machine is able to ascertain the difference between the actual fuel consumption ratio during the operation of the construction machine and the fuel consumption ratio that is to be targeted, and he is also able to view a display that recommends him to improve the fuel consumption.

However, when a task is actually being performed with the construction machine, even if a display that recommends improvement is provided, the operator may be busy with some task and may not have time to execute the course of action that corresponds to the display, or he may even not notice the display itself, either of which eventualities is undesirable, so that there is a fear that the operator will not be able to take an appropriate course of action.

The present invention has been conceived in consideration of the problem described above, and its object is to provide a technique that is able appropriately to determine a course of action by the operator for saving energy, and that can increase the possibility that this course of operation for energy saving will actually be executed.

Means for Solving the Problems

In order to attain the objective described above, according to a first standpoint, the guidance output device according to the present invention is a guidance output device (22) that outputs guidance for energy saving for a construction machine (S), comprising: a guidance storage means (55) that stores guidance for energy saving corresponding to energy wasting operation; an occurrence detection means (53) that, during the operation of the construction machine (S), detects the occurrence of energy wasting operation; and an output control means (55) that, along with outputting corresponding guidance for energy saving when an energy wasting operation has been detected, also outputs the corresponding guidance for energy saving at a predetermined timing after the occurrence of the energy wasting operation. According to this guidance output device, along with outputting guidance for energy saving corresponding to the energy wasting operation that has been detected during operation, it is also possible to output guidance at a predetermined time point thereafter. Due to this, along with it being possible to recommend a course of action for energy saving to the operator at the time point that energy wasting operation occurs, it is also possible to recommend a course of action for energy saving to the operator at a predetermined timing subsequently as well, so that it is possible to increase the probability that he will execute this course of action for energy saving during subsequent operation.

With the guidance output device described above, it would also be acceptable to arrange: for the guidance storage means (55) to store guidances for energy saving corresponding to a plurality of types of energy wasting operation; for there to be further included a priority guidance determination means (54, 55) that, from among guidances for energy saving corresponding to one or more types of energy wasting operation the occurrence of which has been detected by the occurrence detection means (53), determines a guidance for energy saving that is to be outputted as a priority; and for the output control means (55) to output the guidance for energy saving that has been determined to be outputted as a priority, at the predetermined timing. According to this guidance output device, at the predetermined timing, from among the guidances corresponding to the occurrences of energy wasting operations, a guidance that is to be given priority is determined and outputted. Due to this, it is possible for the guidance that is prioritized to make a strong impression upon the operator, and accordingly it is possible to increase the probability that he will execute a course of action for energy saving during subsequent operation.

Moreover, with the guidance output device described above, it would also be acceptable to arrange for there to be further included a measurement means (53) that measures the number of times, or the frequency, that each of the types of energy wasting operation has occurred, and for the priority guidance determination means (54, 55) to determine the guidance for energy saving that is to be outputted as a priority, on the basis of the number of times, or the frequency, at which each of the types of energy wasting operation has occurred. According to this guidance output device, it is possible to determine the guidance for energy saving that is to be outputted as a priority in an appropriate manner on the basis of number of times, or the frequency, of occurrence of each of the types of energy wasting operation.

Moreover, with the guidance output device described above, it would also be acceptable to arrange for the measurement means (53) to measure the number of times from a predetermined time instant, or the number of times from the turning on of a key that is actuation to turn on the power supply of the construction machine (S). According to this guidance output device, it is possible to determine the guidance to be outputted as a priority on the basis of the number of times taking the predetermined time instant as a reference, or the number of times from the turning on of the key. Due to this, if the predetermined time instant is taken as a reference, it is possible to output guidance for the energy wasting operations that have occurred during each day; or, if the number of times from the turning on of the key is measured, then it is possible to output guidance in an appropriate manner to the operator who has turned the key on, for the energy wasting operations that have been performed by that operator.

Moreover, with the guidance output device described above, it would also be acceptable to arrange for there to be further included a transmission means (57) that transmits the number of times, or the frequency, that each of the types of energy wasting operation has occurred to a management center device (60), and a reception means (57) that receives from the management center device (60) average occurrence information related to the average number of occurrences, or the average frequency of occurrence, of energy wasting operation of construction machines of the same type; and for the priority guidance determination means (55) to determine the guidance to be outputted as a priority, on the basis of the average occurrence information that has been received, and the number of times, or the frequency, of occurrence of each of the types of energy wasting operation. According to this guidance output device, it is possible to determine the guidance to be outputted as a priority in an appropriate manner, while giving consideration to the average occurrence information relating to energy wasting operation of construction machines of the same type. Due to this, for example, it is possible to ensure that guidance is preferentially outputted for a type of energy wasting operation for which the number of occurrences (or the frequency) is high as compared to the average number of occurrences (or the frequency) for construction machines of the same type, so that it is possible to output appropriate guidance.

Moreover, with the guidance output device described above, the output control means (55) may compare together the average occurrence information that has been received from the management center device (60) and the number of times, or the frequency, that each of the types of energy wasting operation has occurred, and may output a display (for example a message or an image) (or audio) that specifies the result of this comparison. Due to this, the operator is able to know whether his own operation is good or poor as compared to the average number of occurrences or the average frequency of occurrence on other construction machines (that are construction machines of the same type). And, because of this, it may be anticipated that the motivation of the operator for energy saving operation will be further enhanced.

Moreover, with the guidance output device described above, it would also be acceptable to arrange additionally to include an operation detection means (52) that detects ending of working and/or starting of working of the construction machine; and for the output control means (55) to output the guidance for energy saving upon detection of the ending of working and/or of the starting of working. According to this guidance output device, if the starting of working or the ending of working has been detected, guidance for energy saving corresponding to the type of energy wasting operation that was detected during operation is outputted. If guidance is outputted in this manner when the start of working is detected, then the operator is able to fix this guidance in his mind so as to be able to execute working that is subsequently started, so that it is possible to increase the probability that he will execute a course of action for energy saving during this working. Furthermore, if guidance is outputted when the end of working is detected, then it is possible to encourage the operator to reflect upon his operation during the working that was executed up until this time point, so that it is possible to increase the probability that he will execute a course of action for energy saving while working in the future.

Moreover, with the guidance output device described above, it would also be acceptable to arrange for there to be further included: a guidance storage means that stores, for each operator, operator identification information and guidance for energy saving corresponding to each of the types of energy wasting operation that have been detected during operation by the operator, in mutual correspondence; and an identification information acquisition means that acquires identification information of the operator who performs turning on of a key; and for the output control means to output the guidance for energy saving corresponding to the identification information that has been acquired. According to this guidance output device, it is possible to output guidance for energy saving in an appropriate manner corresponding to energy wasting operation that has been caused in the past by the operator who turned the key on, so that it is possible to urge the operator to pay better attention.

Moreover, with the guidance output device described above, it would also be acceptable to arrange, when fault information for the construction machine (S) is outputted, for the output control means (55) not to output the corresponding guidance for energy saving, even if the energy wasting operation has occurred. Since, according to this guidance output device, no message for energy saving corresponding to energy wasting operation is outputted when fault information is being displayed, accordingly no obstacle is opposed by any message for energy saving to output of the fault information.

Moreover, with the guidance output device described above, it would also be acceptable to arrange for the output control means (55) to output a message specifying that operation is good, if energy wasting operation has not occurred even once. Since, according to this guidance output device, a message that operation is good is outputted to an operator who has not performed any energy wasting operation, accordingly it is possible to enhance the motivation for the operator to perform energy saving operation.

And, in order to attain the objective described above, according to a second standpoint, the guidance output method according to the present invention is a guidance output method that outputs guidance for energy saving for a construction machine (S), comprising: a guidance storage step of storing guidance for energy saving corresponding to energy wasting operation; a detection step of, during the operation of the construction machine (S), detecting the occurrence of energy wasting operation; and an output control step of, along with outputting corresponding guidance for energy saving when an energy wasting operation has been detected, also outputting the corresponding guidance for energy saving at a predetermined timing after the occurrence of the energy wasting operation. According to this guidance output method, along with outputting guidance for energy saving corresponding to the energy wasting operation that has been detected during operation, it is also possible to output guidance at a predetermined time point thereafter. Due to this, along with it being possible to recommend a course of action for energy saving to the operator at the time point that energy wasting operation occurs, it is also possible to recommend a course of action for energy saving to the operator at a predetermined timing subsequently as well, so that it is possible to increase the probability that he will execute this course of action for energy saving during subsequent operation.

BRIEF DESCRIPTION OF THE DRAWINGS

FIG. 2 is a perspective view of principal portions of this construction machine according to an embodiment of the present invention;

FIG. 3 is a simplified schematic figure showing a control system of this construction machine according to an embodiment of the present invention;

FIG. 5A is a figure for explanation of a first example of display on a monitor screen according to this embodiment of the present invention, FIG. 5B is a figure for explanation of a second example of display on the monitor screen according to this embodiment of the present invention, and FIG. 5C is a figure for explanation of a third example of display on the monitor screen according to this embodiment of the present invention;

FIG. 6 is a figure for explanation of conditions related to fuel consumption deteriorated operation according to this embodiment of the present invention, and of guidance that is outputted;

FIG. 9 is a flow chart for a guidance recording and display procedure, according to this embodiment of the present invention;

EMBODIMENTS FOR IMPLEMENTATION OF THE INVENTION

Embodiments of the present invention will now be explained with reference to the drawings. It should be understood that the embodiments explained in the following are not to be considered as being limitative of the present invention, which is to be defined in terms of the scope of the Claims; moreover, the various elements explained in the embodiment and all the combinations thereof are not to be considered as being limitative of the means for solution of the present invention.

First, a construction machine that is an embodiment of the present invention will be explained.

Figure 1:
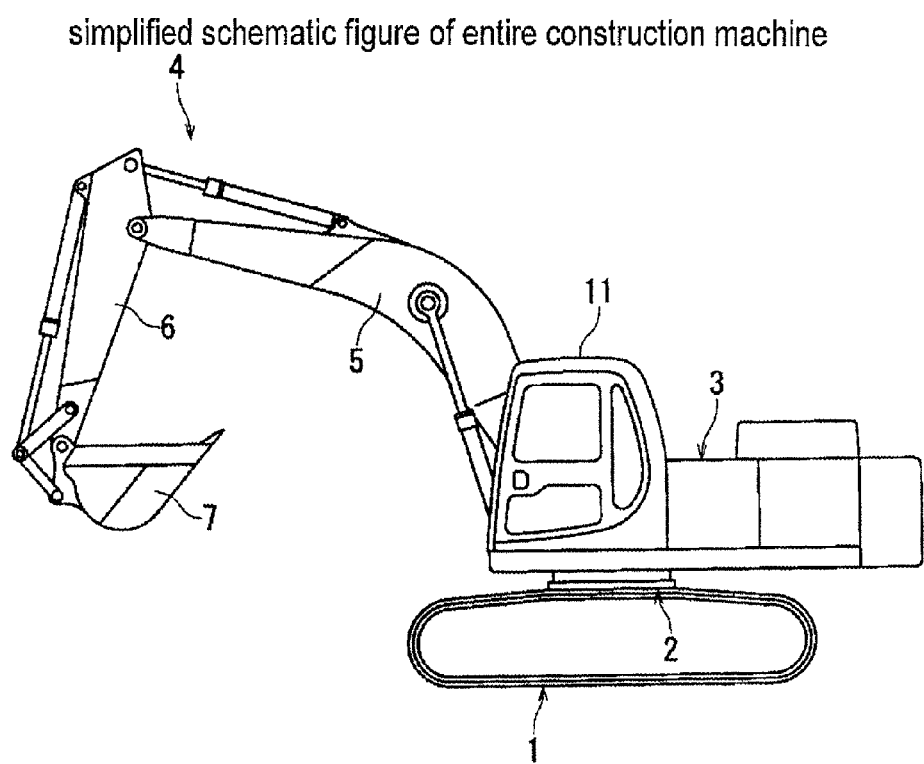
FIG. 1 is a general structural figure showing a hydraulic shovel, which is one example of a construction machine according to an embodiment of the present invention.

FIG. 1 is a general structural figure showing a hydraulic shovel, which is one example of a construction machine according to an embodiment of the present invention. And FIG. 2 is a perspective view of principal portions of the construction machine according to this embodiment of the present invention.

As shown in FIG. 1, this hydraulic shovel which is one example of a construction machine S comprises a lower traveling unit portion 1, an upper pivoting body portion 3 that is installed to the upper portion of the lower traveling unit portion 1 via a pivot mechanism 2 so as to be pivotable thereupon, and a working mechanism 4 that is provided as linked to the upper pivoting body portion 3. The working mechanism 4 comprises a boom 5 whose base portion is linked to the upper pivoting body portion 3 so as to be capable of being rotated with respect thereto, an arm 6 that is linked to the end of the boom 5 so as to be capable of being rotated with respect thereto, and a bucket 7 that is linked to the end of the arm 6 so as to be capable of being rotated with respect thereto. The upper pivoting body portion 3 comprises an operator compartment in which the operator who operates this hydraulic shovel rides.

As shown in FIG. 2, an operator's seat 13 is provided at the central portion of an operator compartment 11 in the upper pivoting body portion 3, and a traveling actuation means 14 is provided in front of the operator's seat 13. The traveling actuation means 14 comprises traveling levers 15 and 16, and traveling pedals 17 and 18 that rotate together with the traveling levers 15 and 16. With the hydraulic shovel of this embodiment, when the traveling levers 15 and 16 are pushed forward, the lower traveling unit portion 1 is driven forward, while, when the traveling levers 15 and 16 are pulled backward, the lower traveling unit portion 1 is driven backward. An attachment pedal 8 is provided in the neighborhood of the traveling actuation means 14. Moreover, an instrument panel 10 is provided near one side window 9.

Working mechanism actuation levers 19 and 20 are installed at the two sides of the operator's seat 13. These working mechanism actuation levers 19 and 20 are controls for performing raising and lowering of the boom 5, rotation of the arm 6 and the bucket 7, pivoting operation of the upper pivoting body portion 3, and so on. A lock lever 21 is provided in the vicinity of one of the working mechanism actuation levers 19. Here, this lock lever 21 is a device for stopping the functions of actuation of the working mechanism 4, pivoting of the upper pivoting body portion 3, traveling of the lower traveling unit portion 1, and so on. In other words, it is possible to lock the movement of the working mechanism 4 and so on by pulling up the lock lever 21 and thus performing actuation thereof, and, in this state, it is ensured that the working mechanism 4 and so on cannot be operated, even if the working mechanism actuation levers 19 and 20 and so on are actuated.

Furthermore, a monitor device 22 that displays various parameters of the construction machine S (engine water temperature, working hydraulic fluid temperature, fuel amount, and so on) is provided in the operator compartment 11. In this embodiment, the monitor device 22 is disposed at the lower portion of a vertical frame 25 that partitions between the front window 23 and one of the side windows 9 of the operator compartment 11. A monitor screen 26 and a pushbutton 27 for actuation are provided on the front surface of an external casing 24 of the monitor device 22. The monitor screen 26 may, for example, consist of a liquid crystal panel.

FIG. 3 is a simplified schematic figure showing a control system of this construction machine according to an embodiment of the present invention.

The control system of the construction machine S comprises an engine 40, a hydraulic pressure pump 31a, a hydraulic pressure pump 31b, an engine controller 32 that controls the engine 40, a pump controller 33 that controls the hydraulic pressure pumps 31a and 31b, a governor motor 34, a sloping plate drive device 35, a rotation sensor 39 that detects the rotational speed of the engine 40, a pressure sensor 43, a working hydraulic fluid temperature sensor 44, an engine water temperature sensor 45, a pivoting lock switch 47, a pressure sensor 48, the working mechanism levers 19 (and 20), and the lock lever 21.

The engine controller 32 controls the governor motor 34 according to a rotational speed that is set on a fuel dial 38, and thus controls the rotational speed of the engine 40. The sloping plate drive device 35 is driven according to control by the pump controller 33, and changes the tilt angle of a sloping plate of the hydraulic pressure pump 31a. And, on the basis of the actual rotational speed of the engine 40 that is detected by the rotation sensor 39, the pump controller 33 controls the sloping plate drive device 35 so that the oil pressure pump absorbs the best matching torque at each output point of the engine 40.

Actuators 37 (i.e., hydraulic actuators) are connected to the hydraulic pressure pump 31 via a control valve 36. These actuators may be a cylinder for the boom, a cylinder for the arm, a cylinder for the bucket, a hydraulic motor for pivoting, a hydraulic motor for traveling, and so on, none of which are shown in the figures. The working mechanism levers 19 (and 20) and the lock lever 21 are connected to the hydraulic pressure pump 31b.

A PPC lock switch 41 is connected to the lock lever 21, and, when the lock lever 21 has been actuated to the lock side, this actuation is detected by the switch 41, and a signal is sent from the switch 41 to a valve (i.e. a solenoid) 42. When the valve 42 receives a signal from the switch 41, it stops functions such as the operation of the working mechanism 4, the pivoting of the upper pivoting body portion 3, the traveling of the lower traveling unit portion 1, and so on.

A knob switch 46 is provided at the upper portion of the working lever 19 for issuing a command to increase the excavation force. This knob switch 46 is connected to the pump controller 33. When the knob switch 46 is on (i.e. is pushed), the pump controller 33 controls the hydraulic pressure pump 31a so as to increase the force supplied to the hydraulic pressure actuator 37.

The pressure sensor 43 is a sensor that detects whether or not the working mechanism levers 19 and 20 have been actuated, and this could be an analog sensor or could be an ON/OFF sensor. It should be understood that, instead of the pressure sensor 43, it would also be acceptable to arrange to install a potentiometer to the actuation lever, and to make a decision as to whether or not the lever has been actuated according to this potentiometer. The working hydraulic fluid temperature sensor 44 is a sensor that detects the temperature of the working hydraulic fluid (i.e. of the oil that flows in the hydraulic circuits), and may, for example, be installed to a working hydraulic fluid tank. The result of detection by the working hydraulic fluid temperature sensor 44 is outputted to the pump controller 33. And the engine water temperature sensor 45 is a sensor that detects the temperature of the cooling water that cools the engine 40 (i.e. the engine water temperature). The result of detection by the engine water temperature sensor 45 is outputted to the engine controller 32. The pivoting lock switch 47 is, for example, a mechanical switch that is provided to a meter board 10 on the right side within the operator compartment 11, and is a switch for making it impossible for the upper pivoting body portion 3 to be pivoted. In other words, when the pivoting lock switch 47 is changed over to the lock side, control is performed by the pump controller 33 so that pivoting of the upper pivoting body portion 3 is not performed. And the pressure sensor 48 detects the pressure of the working hydraulic fluid discharged by the hydraulic pressure pump 31a (i.e. the pump pressure, and outputs its detection result to the pump controller 33.

The engine controller 32 and the pump controller 33 output to the monitor device 22 the results detected by the sensors such as the pressure sensor 43, the working hydraulic fluid temperature sensor 44, the engine water temperature sensor 45, the knob switch 46, the pivoting lock switch 47, the pressure sensor 48 and so on, and information that specifies the states of the switches and so on.

Figure 4:
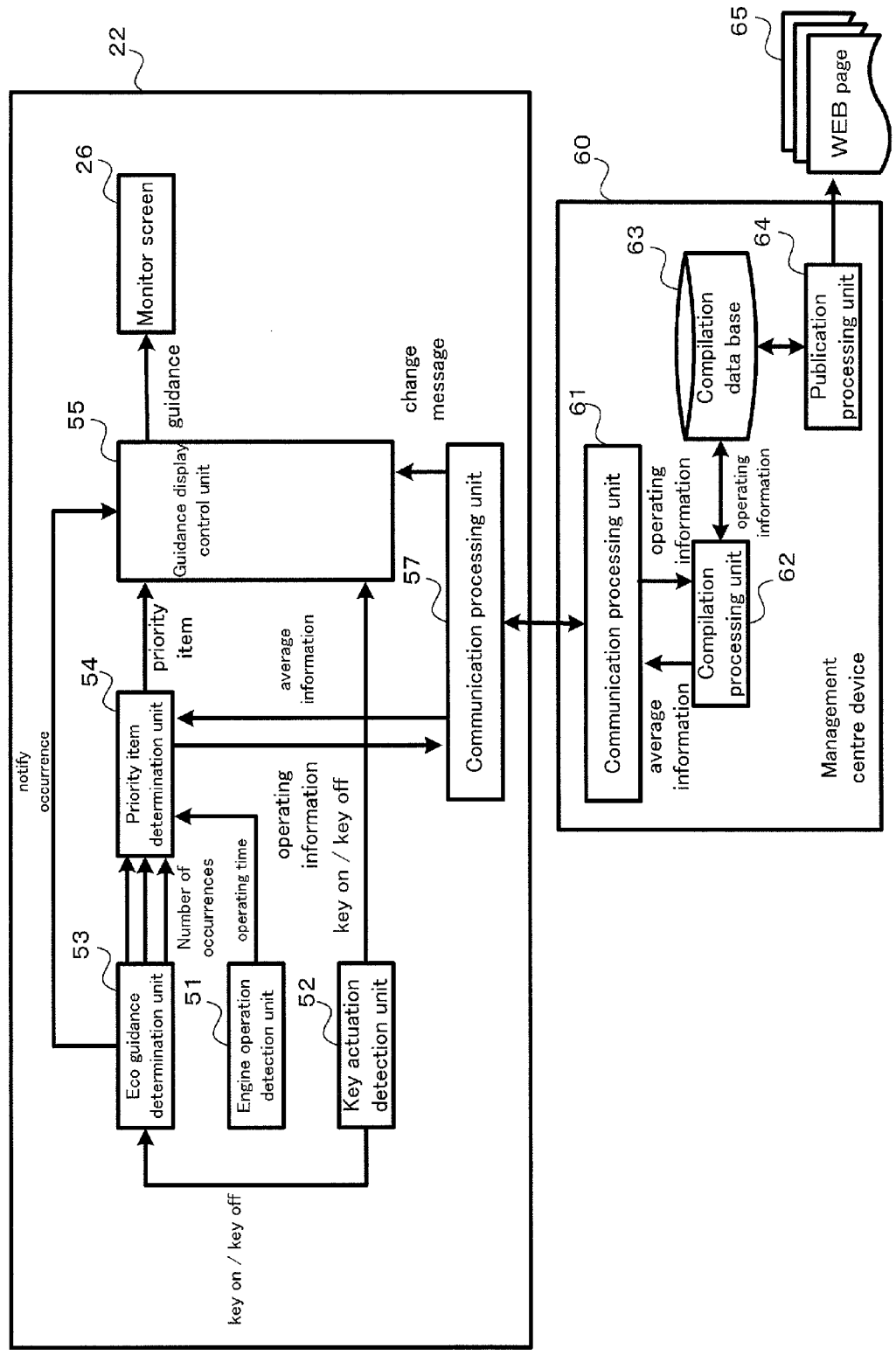
FIG. 4 is a general structural figure showing a monitor device and a management center device according to this embodiment of the present invention.

FIG. 4 is a general structural figure showing a monitor device and a management center device according to this embodiment of the present invention.

The monitor device 22 of the construction machine S (which is one example of a guidance output device) comprises an engine operation detection unit 51, a key actuation detection unit 52 that is one example of an operation detection means, an eco guidance determination unit 53 that is one example of an occurrence detection means and of a measurement means, a priority item determination unit 54, a guidance display control unit 55 that is one example of an output control means, the monitor screen 26, and a communication processing unit 57 that is one example of a transmission means and of a reception means. Here, the priority item determination unit 54 and the guidance display control unit 55 constitute a priority guidance determination means.

The engine operation detection unit 51 detects whether or not the engine 40 is operating, on the basis of information from the engine controller 32, and notifies the operating time period to the priority item determination unit 54. The key actuation detection unit 52 detects key actuation by the operator (i.e. whether the key is on or off) on the basis of, for example, information from the pump controller 33. As another method for detecting key actuation, this could also be detected by monitoring the value of the voltage at the output side of the key switch, which is provided between the battery and components of various types (the monitor device 22, the pump controller 33, and so on). Key operation can be detected because, if the key switch is on, the voltage value at its output side becomes equal to the voltage value of the battery. Moreover, if various types of controller such as the monitor device 22 and so on are started, since power is supplied to them, accordingly it is possible to detect key actuation from the fact that this power is supplied. Furthermore, the key actuation unit 52 notifies information specifying that key actuation has been detected to the eco guidance determination unit 53 and to the guidance display control unit 55. And the monitor screen 26 includes, for example, a liquid crystal display screen, and displays information of various types.

On the basis of information specifying the states of various sensors and switches outputted from the engine controller 32 and the pump controller 33, the eco guidance determination unit 53 detects occurrence of a plurality of types of operation in which the fuel consumption is deteriorated (which are examples of energy wasting operation), and, along with notifying the occurrence of fuel consumption deteriorated operation to the guidance display control unit 55, also counts the number of occurrences of fuel consumption deteriorated operation, and notifies this number of occurrences of fuel consumption deteriorated operation to the priority item determination unit 54. In this embodiment, the eco guidance determination unit 53 comprises a number each day storage unit for storing the number of times of fuel consumption deteriorated operation during each day (for example during a 24 hour period from 00:00 on each day), and a number each time key on storage unit for storing the number of times of fuel consumption deteriorated operation that have occurred from when the key was last turned on; and the eco guidance determination unit detects the occurrence of a plurality of types of fuel consumption deteriorated operation, counts the number of occurrences, and notifies the number of occurrences of fuel consumption deteriorated operation to the priority item determination unit 54.

As shown in FIG. 6, examples of fuel consumption deteriorated operation are: operation in which idling is performed over a long period of time (item name specifying this operation: "idling for a long time"); operation with continuous relief of hydraulic pressure (item name specifying this operation: "hydraulic pressure relief"); operation that is executed in a high energy mode and that could be executed in energy saving mode (E mode) (item name specifying this operation: "E mode recommended"); and operation in which traveling is performed with the throttle in a highly open state (item name specifying this operation: "traveling partial recommended").

In the following, a hydraulic shovel will be explained as one example of a construction machine S. A typical hydraulic shovel is provided with a plurality of working modes that specify types of basic tasks for which the working load is different. For example, there are working modes such as a "P mode" and an "E mode" and so on. When performing working, it is possible for the operator himself to select one or another working mode according to the details of the task that is henceforth going to be performed. And, according to the working mode that has been selected, the hydraulic shovel operates in one or another of different control patterns. A summary of each of the working modes is as follows.

Figure 10A:
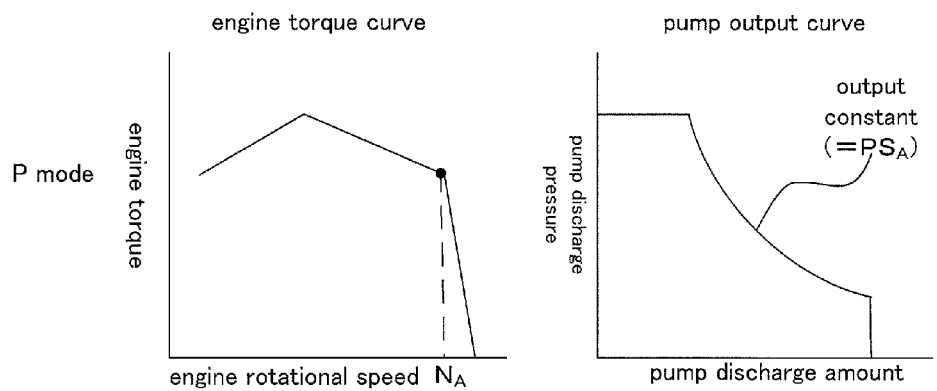
FIG. 10A is a figure showing the characteristics of a P mode according to this embodiment of the present invention.
Figure 10B:
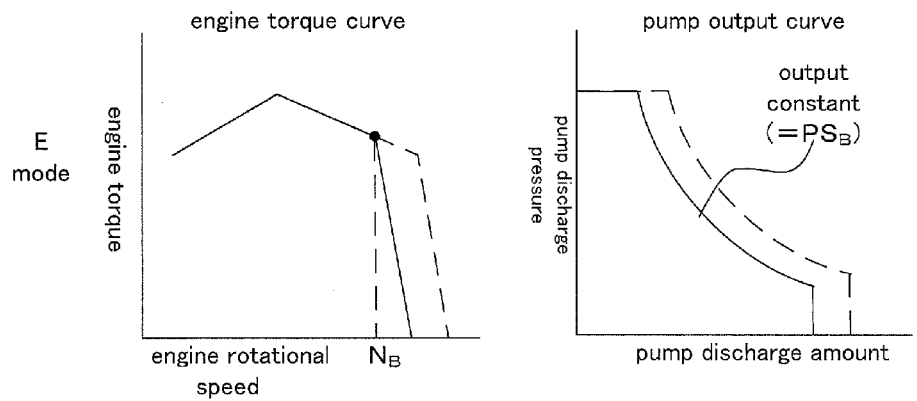
FIG. 10B is a figure showing the characteristics of an E mode according to this embodiment of the present invention.

The "P mode" is a working mode for performing an excavation task in which the load is high (i.e. that gives emphasis to the amount of working), and, when its operational characteristics are shown using an engine torque curve and a pump output curve, they appear as shown in FIG. 10(*a*). In other words, the engine rotational speed operates so as to remain almost constant at $N_A$, and the output of the pump (i.e. its horsepower) also operates so as to remain almost constant at $PS_A$.

And the "E mode" described above is a working mode for performing an excavation task in which the load is smaller than in the P mode (i.e. that gives emphasis to fuel consumption), and, when its operational characteristics are shown using an engine torque curve and a pump output curve, they appear as shown in FIG. 10(*b*). Each of the curves shown here by the broken lines is the curve for the P mode. In other words, the engine rotational speed operates so as to remain almost constant at $N_B$, and the output of the pump also operates so as to remain almost constant at $PS_B$.

FIG. 6 will now be referred to for a second time. Idling for a long time is operation in which the conditions are satisfied that there is no operational actuation by the operator (i.e., actuation of the traveling levers 15 and 16 and the actuation levers 19 and 20 and so on), and that this state continues for a predetermined time interval; hydraulic pressure relief is operation in which the conditions are satisfied that operation by the operator (i.e. operation of the working mechanism levers 19 and 20) is taking place, that the state is other than warming up operation, and that the state that the pump pressure (i.e. the pressure of the working hydraulic fluid at the output side from the pump) is greater than or equal to a hydraulic pressure relief pressure (i.e. a pressure that is set for hydraulic pressure relief to be performed) has continued for a predetermined time interval; E mode recommended operation is operation in which the condition is satisfied that the horsepower generated is within the E mode range; and partially open throttle traveling recommended operation is operation in which the conditions are satisfied that traveling operation is taking place, and that the throttle command continues to be in the state of being greater than or equal to a predetermined amount for a predetermined time interval. It should be understood that whether warming up is currently being performed, or some other type of operation is taking place, may be determined on the basis of at least any one of, for example, whether a predetermined time period (for example, five minutes) has elapsed from starting of the engine 40, whether the engine water temperature is less than or equal to a predetermined temperature or not, whether the temperature of the working hydraulic fluid is less than or equal to a predetermined temperature or not, or the like.

The eco guidance determination unit 53 detects the occurrence of each of these types of fuel consumption deteriorated operation by making a decision as to whether or not the above described conditions for each type of fuel consumption deteriorated operation are satisfied. Since, in this embodiment, the eco guidance determination unit 53 takes the precondition that the current state is other than warming up operation as one of the conditions for hydraulic pressure relief type fuel consumption deteriorated operation, accordingly, during warming up operation, since this is not considered as being fuel consumption deteriorated operation, no guidance with respect to hydraulic pressure relief is displayed, since no notification of the occurrence of fuel consumption deteriorated operation is notified to the guidance display control unit 55. Due to this, during the required warming up operation for the construction machine S, no guidance is displayed to the effect that the warming up operation should be terminated.

In order preferentially to output guidance for energy saving on the basis of the number of times of occurrence of each type of fuel consumption deteriorated operation as notified from the eco guidance determination unit 53, the priority item determination unit 54 determines fuel consumption deteriorated operation, and notifies the guidance display control unit 55 thereof. For example, the priority item determination unit 54 may determine that guidance for energy saving for fuel consumption deteriorated operation that has occurred many times should be outputted preferentially. Here, as the number of times that is to be used in the comparison, on the basis of a setting, either the number of times in each day, or the number of times from when the key was last turned on may be used. For example, if the number of times from when the key was last turned on is taken as the reference, then, for example, if it is decided that the key will be turned on each time the operator changes, then it is possible to determine upon appropriate guidance for the operator who is currently driving.

It should be understood that it would also be acceptable to arrange for the priority item determination unit 54 to determine upon fuel consumption deteriorated operation for which guidance for energy saving should be preferentially outputted, on the basis of the number of times of occurrence of fuel consumption deteriorated operation as notified from the eco guidance determination unit 53, and average information as notified from the communication processing unit 57. Here, this average information is information related to the average number of times of each type of fuel consumption deteriorated operation for construction machines S of the same type (by construction machines S of the same type is meant hydraulic shovels which are excavation machines (it would also be acceptable for them to have the same bucket capacity), or wheel loaders or the like that are loading machines); and, for example, it would also be acceptable to arrange for this to be the reciprocal of the average value of the number of times that each type of fuel consumption deteriorated operation has occurred for the same type of construction machine. If the average information is the reciprocal of the average value of the number of times of occurrence for the same type of construction machine, then the priority item determination unit 54 multiplies together the number of times of occurrence of each type of fuel consumption deteriorated operation as notified from the eco guidance determination unit 53, and the reciprocal of the average value that corresponds to each type of fuel consumption deteriorated operation, and determines the fuel consumption deteriorated operation for which the result of this multiplication is the largest as being the one for which guidance for energy saving is to be preferentially outputted. Since, in this case, the guidance to be outputted as a priority is not determined by simply comparing together the number of times of occurrence of each of the plurality of types of fuel consumption deteriorated operation, but rather it is possible to determine the guidance to be outputted as a priority while taking into account the operational states of the other construction machines, accordingly it is possible to decide that guidance should be outputted as a priority for that type of fuel consumption deteriorated operation that is poor (i.e. for which the number of occurrences is great) as compared to the other construction machines.

It should be understood that, in this embodiment, if the values that are compared are the same, then it is arranged for the priority item determination unit 54 to determine the type of fuel consumption deteriorated operation for which guidance is to be outputted according to a priority order that is set in advance. In concrete terms, for example, if the values that are compared are the same, then it is arranged to determine the messages to be outputted in the priority order: idling for a long time, E mode recommended, partially open throttle traveling recommended, and hydraulic pressure relief.

Moreover, if the number of occurrences of each type of fuel consumption deteriorated operation is zero, then the priority item determination unit 54 notifies the guidance display control unit 55 that outstandingly good operation has been performed. It should be understood that, in this embodiment, the priority item determination unit 54 notifies the guidance display control unit 55 that outstandingly good operation has been performed if, over an operating time period that is greater than or equal to a predetermined time period (for example one hour), the number of occurrences of each of the types of fuel consumption deteriorated operation is zero. By imposing the condition that the operating time period should be greater than or equal to a predetermined time period in this manner, it is ensured that a notification to the effect that outstandingly good operation has been performed is not issued after operation for an extremely short time period, such as one in which fuel consumption deteriorated operation almost certainly does not occur in any case.

Furthermore, the priority item determination unit 54 notifies operating information to the communication processing unit 57 including the number of occurrences of each of the types of fuel consumption deteriorated operation.

Yet further, the guidance display control unit 55 stores guidance corresponding to each of the types of fuel consumption deteriorated operation. As shown in FIG. 6, as guidance in response to each type of fuel consumption deteriorated operation, the guidance display control unit 55 stores, for example, eco guidance which is guidance for being outputted immediately when this type of fuel consumption deteriorated operation has been detected, and one-point guidance which is guidance for being outputted at a predetermined timing after this type of fuel consumption deteriorated operation has been detected (in this embodiment, when the key is turned on and when the key is turned off). For example, in response to idling for a long time, the guidance display control unit 55 may store "Avoid idling for a long time" as eco guidance, and may store "Diligently stopping engine operation during idling keeps fuel consumption down" as one-point guidance.

Even further, as shown in FIG. 5A, when the occurrence of fuel consumption deteriorated operation has been notified from the eco guidance determination unit 53, the guidance display control unit 55 displays a screen 70 on the monitor screen 26 that shows the temperature of the engine water, the temperature of the hydraulic fluid, and the amount of fuel, together with guidance 71 that corresponds to this fuel consumption deteriorated operation. It should be understood that, in this embodiment, when display of an anomaly in relation to the construction machine (such as, for example, overheating of the engine water temperature or the like) is being provided upon the monitor screen 26, even if the occurrence of fuel consumption deteriorated operation has been notified from the eco guidance determination unit 53, the guidance display control unit 55 gives a priority level to the display of guidance corresponding to this fuel consumption deteriorated operation that is lower than the priority level of the anomaly display, and thus does not display any guidance corresponding to this fuel consumption deteriorated operation on the monitor screen 26. It should be understood that it would also be possible to set the priority level for anomaly display in advance to be higher than the priority level of any of the guidance displays corresponding to fuel consumption deteriorated operation.

Still further, if the guidance display control unit 55 has received information from the key actuation detection unit 52 that the key has been actuated to on or to off, then, as shown in FIG. 5B, the guidance control unit causes a screen 80 to be displayed on the monitor screen 26 including guidance 81 (in this embodiment, one-point guidance) corresponding to the type of fuel consumption deteriorated operation that has been notified by the priority item determination unit 54. It should be noted that, in this embodiment, directly before the key is turned off, the guidance display control unit 55 stores the guidance that has been displayed, and also, directly after the key is turned on, it displays a screen 80 on the monitor screen 26 including this guidance 81 that has been stored. It should be understood that it would also be acceptable to arrange for the guidance display control unit 55 to display guidance in only one of these cases, i.e. only when the key is turned on or only when it is turned off.

Furthermore, if a notification has been received from the priority item determination unit 54 to the effect that operation is excellent, then the guidance display control unit 55 causes a message to the effect that operation is excellent to be displayed on the monitor screen 26 when the key is turned off. Since a message to the effect that operation is excellent is displayed in this manner, it is possible to improve the motivation of the operator with regard to operation. Moreover, if a change message has been received from the communication processing unit 57, then the guidance display control unit 55 changes to guidance and causes the change message to be displayed upon the monitor screen 26. Moreover, if data such as an image, color, audio, or the like has been received along with the change message, the guidance display control unit 55 displays an image or outputs audio on the basis thereof.

Furthermore, if a command has been received from the operator for display of an eco guidance record screen, then the guidance display control unit 55 causes the eco guidance record screen 90 shown in FIG. 5C to be displayed upon the monitor screen 26. As shown in FIG. 5C, on this eco guidance record screen 90 there are included a number of times display region 92 in which the number of occurrences of each type of fuel consumption deteriorated operation is displayed, and a one-point guidance display region 93 in which guidance (in this embodiment, one-point guidance) is displayed. It should be understood that, although FIG. 5C shows an example of a screen when a setting has been established for guidance to be determined according to the number of times in each day, if for example a setting has been established for guidance to be determined according to the number of times from when the key is turned on, then, along with displaying the number of times from when the key is turned on, guidance will be determined and displayed on the basis of the number of times from when the key is turned on.

The communication processing unit 57 receives operating information from the priority item determination unit 54, and transmits information to the management center device 60 that includes the identification information in this operating information for this construction machine S and for its operator (for example, for the driver). Furthermore, the communication processing unit 57 receives average information from the management center device 60, and transfers it to the priority item determination unit 54. Moreover, the communication processing unit 57 receives change messages from the management center device 60, and transfers them to the guidance display control unit 55. Yet further, the communication processing unit 57 receives data such as images, color, audio and so on from the management center device 60, and transfers this data to the guidance display control unit 55.

The management center device 60 that is installed in the management center and that manages a plurality of construction machines S comprises a communication processing unit 61, a compilation processing unit 62, a compilation data base 63, and a publication processing unit 64.

The communication processing unit 61 performs communication with the plurality of construction machines S. And the communication processing unit 61 receives operating information from the plurality of construction machines S, and transfers the operating information that it has received to the compilation processing unit 62. Moreover, the communication processing unit 61 receives average information from the compilation processing unit 62, and transmits this average information to each of the construction machines S. Furthermore, the communication processing unit 61 receives change messages from the compilation processing unit 62, and transmits these change messages to the construction machines S. Yet further, if data such as an image, color, audio, or the like has been received along with a change message, then the communication processing unit 61 transmits this data to a construction machine S.

The compilation processing unit 62 stores the operating information that it has received from the communication processing unit 61 in the compilation data base 63. Moreover, on the basis of the information in the compilation data base 63, the compilation processing unit 62 calculates information related to the average number of times of occurrence of each type of fuel consumption deteriorated operation for construction machines S of the same type (for example, the reciprocal of the average number of times), and transmits this information to the construction machines S with the communication processing unit 61. And if, on the basis of the operating information, a predetermined condition is satisfied, then the compilation processing unit 62 transmits a change message to be displayed by a construction machine S via the communication processing unit 61. For example, if the number of times of occurrence of this type of fuel consumption deteriorated operation specified by the information is less than for other construction machines S of the same type, in other words if it is excellent, then the compilation processing unit 62 transmits a message to the effect that the current operation is excellent to that construction machine S. Moreover, apart from the change message that is to be displayed by that construction machine S, the compilation processing unit 62 is also able to transmit data such as an image, color, audio and so on, via the communication processing unit 61.

The compilation data base 63 stores operating information that has been received from the plurality of construction machines. And the publication processing unit 64 generates various web pages 65 on the basis of the information in the compilation data base 63, and publishes them so that they may be read. For example, the publication processing unit 64 may create a web page 65 that includes the average number of times of occurrence of fuel consumption deteriorated operation for each of the construction machines S of the same type, and/or a ranking or the like for the number of times of occurrence of fuel consumption deteriorated operation for each of the construction machines S.

Next, the operation for state display processing according to this embodiment of the present invention will be explained.

Figure 7:
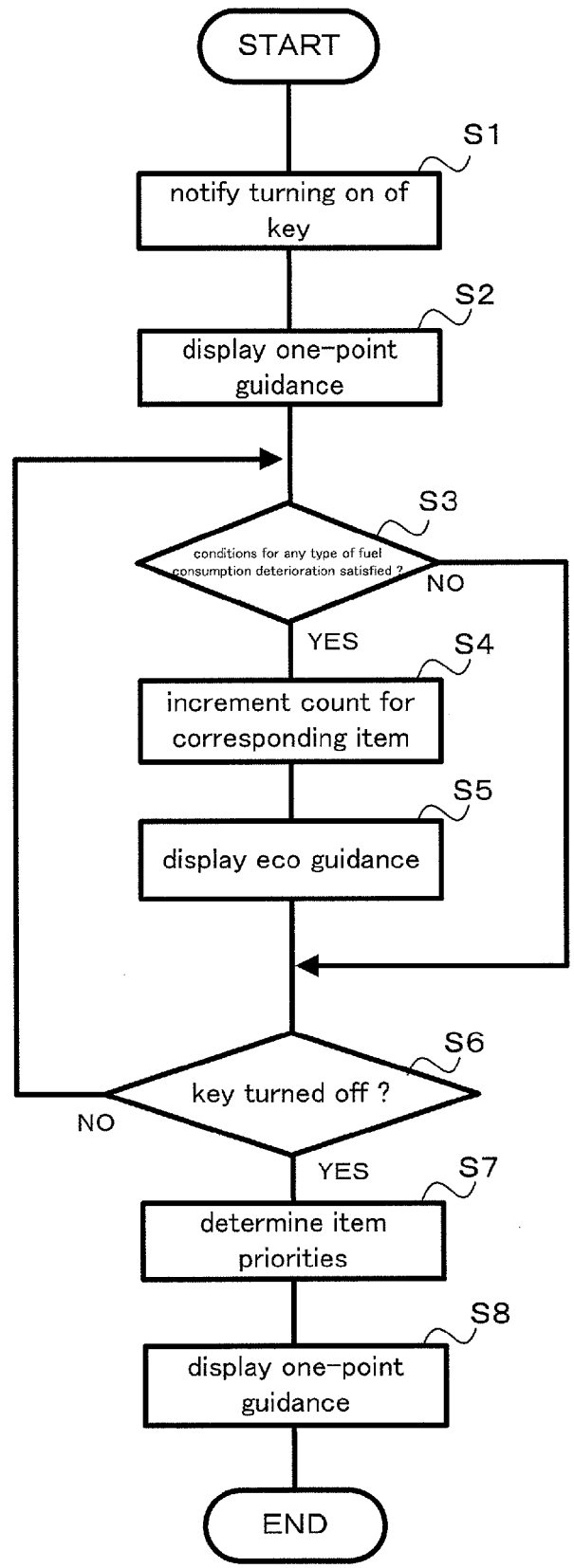
FIG. 7 is a flow chart for a display control procedure according to this embodiment of the present invention.

FIG. 7 is a flow chart for a state display procedure according to this embodiment of the present invention. The processing of FIG. 7 is started when, on the construction machine S, the key is switched on by the operator.

When the key of the construction machine S is turned on by the operator, the key actuation determination unit 52 notifies the guidance determination unit 53 and the guidance display control unit 55 of the fact that turning on of the key has occurred (a step 51), and, as shown in FIG. 5B, the guidance display control unit 55 displays a screen 80 on the monitor screen 26 that includes the guidance 81 that was stored during the previous episode of operation (i.e. the guidance corresponding to the type of fuel consumption deteriorated operation that was notified by the priority item determination unit 54 during the previous episode of operation). Since the guidance corresponding to the type of fuel consumption deteriorated operation that occurred during the previous episode of operation is displayed directly after the key is turned on in this manner, accordingly, in this episode of operation, the operator is able to perform his task while keeping that guidance in mind, so that, as a result, there is a tendency towards the enhancement of fuel consumption.

Next, the eco guidance determination unit 53 decides whether or not the conditions for any of the plurality of types of fuel consumption deteriorated operation are satisfied (a step S3), and if the conditions are not satisfied, then the flow of control is transferred to a step S6.

On the other hand, if some set of conditions is satisfied (YES in the step S3), then, along with notifying the occurrence of this fuel consumption deteriorated operation to the guidance display control unit 55, the number of occurrences of the corresponding type of fuel consumption deteriorated operation is counted (a step S4), and the number of occurrences of each type of fuel consumption deteriorated operation is notified to the priority item determination unit 54. In this embodiment, both the number for each day and also the number from when the key was turned on are counted.

When the guidance display control unit 55 receives a notification of the occurrence of fuel consumption deteriorated operation from the eco guidance determination unit 53, then, as shown in FIG. 5A, it additionally displays (a step S5) guidance 71 that corresponds to this fuel consumption deteriorated operation on a screen 70 on the monitor screen 26 that shows the state of the construction machine such as, for example, engine water temperature, working hydraulic fluid temperature, fuel amount and so on. Due to this, it is possible to encourage the operator to suppress this fuel consumption deteriorated operation that is currently occurring in an appropriate manner.

Next, the key actuation detection unit 52 decides whether or not turning off of the key has occurred (a step S6), and if turning off of the key has not occurred (NO in the step S6) then the flow of control is transferred to the step S3. On the other hand, if turning off of the key has occurred, then the key actuation detection unit 52 notifies the eco guidance determination unit 53 and the guidance display control unit 55 of the fact that turning off of the key has occurred, and the eco guidance determination unit 53 notifies the priority item determination unit 54 of the number of occurrences of each of the types of fuel consumption deteriorated operation. And, on the basis of the numbers of occurrences that have been notified, the priority item determination unit 54 determines the type of fuel consumption deteriorated operation for which guidance is to be outputted as a priority (i.e., the priority item) (a step S7), and notifies the guidance display control unit 55. And, as shown in FIG. 5B, the guidance display control unit 55 displays a screen 80 on the monitor screen 26 that includes guidance 81 (in this embodiment, one-point guidance) corresponding to the type of fuel consumption deteriorated operation that has been notified from the priority item determination unit 54 (a step S8), and then processing terminates. Since guidance corresponding to the fuel consumption deteriorated operation that occurred during operation is displayed in this manner when the key is turned off, accordingly the operator is able to review the fuel consumption deteriorated operation that has occurred during this operational episode, and is able to employ this review advantageously in subsequent operation.

It should be understood that in this embodiment, when turning off actuation of the key has been performed (YES in the step S6), during the interval until the step S8 terminates, it is arranged for the supply of electrical power to be maintained to the locations where operation is still being performed (for example, to the guidance display control unit 55, the monitor screen 26, and so on). As a structure for maintaining supply of electrical power in this manner (i.e. as an electrical power maintenance section), for example, it will be acceptable to arrange to provide a control unit that controls a relay so that supply of power from the battery is not cut off until the step S8 terminates; or it would also be acceptable to arrange to provide a separate battery for supplying the required electrical power from after the supply of electrical power from the main battery has stopped due to turning off of the key, until the processing of the step S8 terminates.

Figure 11:
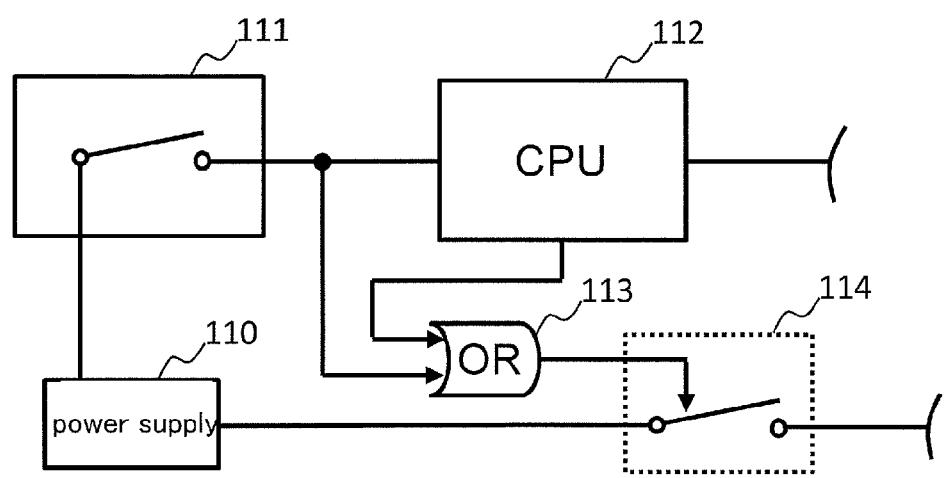
FIG. 11 shows an example of a structure for maintaining supply of electrical power.

In order to maintain the supply of electrical power, for example, as shown in FIG. 11, it would also be possible to provide a power supply line that comprises a power supply 110, a key switch 111, a CPU 112, an OR circuit 113, and an internal power supply switch 114. The power supply 110 is connected to the CPU 112 and the OR circuit 113 via the key switch 111. Moreover, the key switch 111 and the CPU 112 are connected to the internal power supply switch 114 via the OR circuit 113. It should be understood that power is supplied to the CPU 112 from the power supply 110 via the internal power supply switch 114.

The OR circuit 113 and the internal power supply switch 114 are implemented as discrete components such as transistors or the like. Furthermore, the CPU 112, the OR circuit 113, and the internal power supply switch 114 are located within the monitor device 22.

When the key switch 111 is turned on, power is supplied from the power supply 110 to the OR circuit 113. Furthermore, this on signal is supplied to the CPU 112. The internal power supply switch 114 is turned on by the OR circuit 113, and power is supplied to the CPU 112 via the internal power supply switch 114. It should be understood that, when the CPU 112 receives the on signal, it outputs a signal to turn the internal power supply switch 114 on to the OR circuit 113.

On the other hand, when the key switch 113 is turned off, its off signal is supplied to the OR circuit 113. However, due to the logic function of the OR circuit 113, the internal power supply switch 114 cannot be turned off only by this off signal from the key switch 113. In the example shown in FIG. 11, the OR circuit 113 can turn the internal power supply switch 114 off due to an off signal from the key switch 111 and also an off signal from the CPU 112 (i.e. an off signal that is transmitted to the OR circuit 113 after a predetermined time period has elapsed after the CPU 112 has received the off signal).

In other words, even if the key switch 111 is turned off, since the internal power switch 114 is in the on state, the power supply to the CPU 112 is maintained via the internal power supply switch 114. However, the CPU 112 recognizes that no on signal (i.e. power supply) is being supplied from the power supply 110. The CPU 112 is accordingly able to adjust the time for transmitting an off signal to the OR circuit 113 to just the required time period from the time point that it has recognized that the on signal (i.e. the power supply) is not being supplied. Thus, with the structure shown in FIG. 11, it becomes possible to perform operation so that, even if the key switch 111 is turned off, the supply of electrical power can be maintained for a predetermined time period thereafter.

Figure 8:
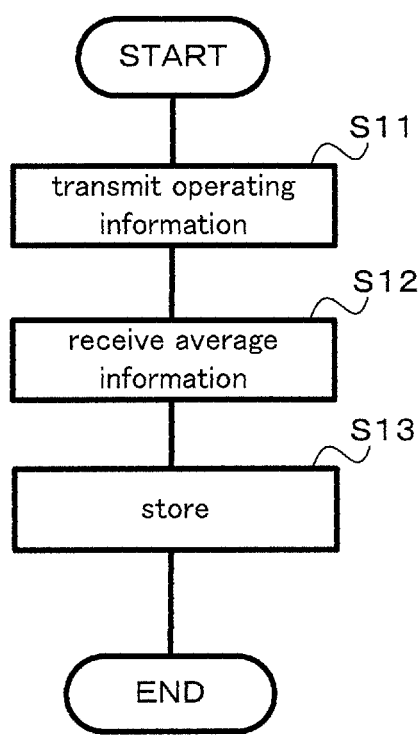
FIG. 8 is a flow chart for a procedure for information communication with a management center device, according to this embodiment of the present invention.

FIG. 8 is a flow chart for a procedure for information communication with the management center device, according to this embodiment of the present invention. The information communication processing of FIG. 8 may be executed, for example, after the time passes 00:00 on each day.

The communication processing unit receives operating information in advance from the priority item determination unit 54, and transmits it to the management center device 60, including identification information and so on for this construction machine S itself (a step S11).

By contrast, in the management center device 60, the communication processing unit 61 receives this operating information from the construction machines S, and transfers the operating information that it has received to the compilation processing unit 62. The compilation processing unit 62 stores the operating information that it has received from the communication processing unit 61 in the compilation data base 63, calculates information related to the average number of times of occurrence of each type of fuel consumption deteriorated operation for construction machines S of the same type on the basis of the information in the compilation data base 63, and transfers this information to the communication processing unit 61. Next, the communication processing unit 61 transmits this average information that it has received from the compilation processing unit 62 to the construction machines S.

Subsequently, the communication processing unit 57 of the construction machine S receives the average information from the management center device 60, and stores it in a predetermined storage unit so that it can be used by the priority item determination unit 54 (a step S13). Due to this, subsequently, the priority item determination unit 54 becomes capable of utilizing the average information, and becomes able to select guidance to be outputted according to priority, while giving consideration to the number of occurrences upon other construction machines S. It should be understood that the guidance display control unit 55 may compare together the average information that is stored in the storage unit and the operating information of this construction machine S, and may output a display (for example a message or an image) that describes the result of this comparison. Due to this, the operator is able to know whether his own operation is good or poor, by comparing it with the average number of occurrences or with the average frequency of occurrences for other construction machines S (i.e., for construction machines S of the same type). Because of this, it is possible to anticipate enhancement of the motivation of the operator for performing energy saving operation.

FIG. 9 is a flow chart for a guidance recording and display procedure, according to this embodiment of the present invention.

The priority item determination unit 54 decides whether or not a guidance display request has been received from the operator, and if no guidance display request has been received (NO in the step S21), waits until a guidance display request is received.

On the other hand, if a guidance display request has been received (YES in the step S21), then, on the basis of the numbers of occurrence of each of the types of fuel consumption deteriorated operation that have been notified from the eco guidance determination unit 53, the priority item determination unit 54 determines the fuel consumption deteriorated operation for which guidance for energy saving should be preferentially outputted (a step S22), and notifies this to the guidance display control unit 55. And, on the basis of the fuel consumption deteriorated operation for which notification has been received, the guidance display control unit 55 displays an eco guidance record screen 90 as shown in FIG. 5C on the monitor screen 26 that includes number of times display regions 92 in each of which the number of times of occurrence of a type of fuel consumption deteriorated operation is displayed, and a one-point guidance display region 93 in which guidance (in this embodiment, one-point guidance) is displayed (a step S23). Due to this, the operator is able to view this guidance for energy saving at a desirable timing.

While the present invention has been explained above on the basis of an embodiment, the present invention is not limited to the embodiment described above; it may be applied in various other ways.

For example, in the embodiment described above, it would also be acceptable to employ identification information for identifying the operator, and to arrange for the eco guidance determination unit 53 to store this identification information and the number of times that each type of fuel consumption deteriorated operation has occurred during operation by that operator in mutual correspondence, and for the priority item determination unit 54 to determine for which type of fuel consumption deteriorated operation guidance should be outputted as a priority, on the basis of the identification information of the operator who has turned the key on and the corresponding numbers of times. When this is done, it is possible to arrange to output guidance for each operator in an appropriate manner. Here, as a method for the construction machine S to receive identification information for the operator, for example, it may be practiced to make the operator input his identification information directly with the pushbutton 27; or it would also be acceptable to arrange to prepare a storage medium (for example, an IC card or an ID key (i.e., a key having a memory function)) on which the identification information of the operator is stored may be prepared, and to provide the construction machine S with a functional section for reading from that storage medium (i.e. an identification information acquisition means).

Furthermore, it would also be acceptable to arrange for the guidance display control unit 55 (i.e. the guidance storage means for each operator): to store the identification information for each operator and the guidance for the fuel consumption deteriorated operation that has been determined should be outputted as a priority in mutual correspondence; when the key is turned on, to receive the identification information for the operator who turned the key on; and to display the guidance corresponding to that identification information. When this is done, it is possible to output guidance that is appropriate for each operator when that operator turns the key on.

Furthermore while, in the embodiment described above, it was arranged to perform communication once after 00:00, the present invention is not limited thereto; for example, it would also be acceptable to arrange to do so each time the key is turned on, or to do so each time the key is turned off, or to do so when a predetermined time period has elapsed (for example, each hour).

Furthermore while, in the embodiment described above, it was arranged to perform display of guidance for fuel consumption deteriorated operations while taking the turning of the key on and off for reference, the present invention is not limited thereto; instead of the turning of the key on and off, it would also be acceptable to take, for reference, the turning of the engine on and off, or the supply and the stopping of supply of battery voltage to the monitor device 22, or the turning of the display on the monitor screen on and off, or the like; the point is that time points that are substantially the same as the start of working and the end of working should be taken for reference.

Furthermore, in the embodiment described above, it would also be acceptable to arrange for the communication processing unit 57 to be located externally to the monitor device 22. In this case, the information that is transmitted and received will be exchanged with the monitor device 22 via an in-vehicle network (CAN: Controller Area Network).

Furthermore while, in the embodiment described above, fuel-wasting operation was shown as an example of energy wasting operation, for example, with a construction machine that is provided with a motor that operates using electrical power, it would also be acceptable to take power wasting operation as energy wasting operation.

Furthermore while, in the embodiment described above, it was arranged to determine the guidance to be outputted as a priority on the basis of the number of times of occurrence of each type of energy wasting operation, it would also be acceptable to arrange to determine the guidance to be outputted as a priority on the basis of the frequency of occurrence of each type of energy wasting operation.

Furthermore while, in the embodiment described above, it was arranged to cause the guidance to be displayed upon a display screen, the present invention is not limited thereto; it would also be acceptable, for example, to arrange to output the guidance by audio.

Furthermore, in the embodiment described above, among the various types of guidance for energy saving corresponding to the various types of energy wasting operation, the guidance for energy saving to be outputted as a priority is determined on the basis of the number of times of occurrence of each type of energy wasting operation, or the like. However, it is possible to display guidance for energy saving according to the same theory even for construction machines of different types. Because of this, comparison of the display and of the motivation of the operator for energy saving operation can be performed between construction machines of different types.

Explanation Of The Reference Symbols

S: construction machine, 1: lower traveling unit portion, 2: pivot mechanism, 3: upper pivoting body portion, 4: working mechanism, 5: boom, 6: arm, 7: bucket, 8: attachment pedal, 9: side window, 10: instrument panel, 11: operator compartment, 13: operator's seat, 14: traveling actuation means, 15: traveling lever, 16: traveling lever, 17: traveling pedal, 18: traveling pedal, 19: working mechanism actuation lever, 20: working mechanism actuation lever, 21: lock lever, 22: monitor device, 23: front window, 24: external casing, 25: vertical frame, 26: monitor screen, 27: pushbutton, 30: display means, 31*a*, 31*b*: hydraulic pressure pumps, 32: engine controller, 33: pump controller, 34: governor motor, 43: pressure sensor, 44: working hydraulic fluid temperature sensor, 45: engine water temperature sensor, 46: knob switch, 47: pivoting lock switch, 48: pressure sensor, 51: engine operation detection unit, 52: key actuation detection unit, 53: eco guidance determination unit, 54: priority item determination unit, 55: guidance display control unit, 57: communication processing unit, 60: management center device, 61: communication processing unit, 62: compilation processing unit, 63: compilation data base, 64: publication processing unit, 65: web page.

The invention claimed is:

1. A guidance output method that outputs guidance for energy saving for a construction machine on which a guidance output device is mounted, the guidance output device receives outputs from a control system of the construction machine, comprising:
    a guidance storage step of storing, by a guidance storage unit of the guidance output device, guidances for energy saving corresponding to a plurality of categories of energy wasting operations with priorities of said guidances;
    a detection step of, during the operation of said construction machine on which said guidance output device is mounted, detecting by the guidance output device the occurrence of energy wasting operation;
    a determining step of, by the guidance output device, determining whether the energy wasting operation has continued for at least a predetermined time interval;
    an output control step of, by the guidance output device, along with outputting corresponding guidance for energy saving when said energy wasting operation has been detected, also outputting said corresponding guidance for energy saving at a predetermined timing after the occurrence of said energy wasting operation, when it is determined that the energy wasting operation continues for at least the predetermined time interval, and wait to output said corresponding guidance until after the energy wasting operation continues for at least the predetermined time interval; and
    a priority guidance step that determines, by the guidance output device, whether two or more categories of said energy wasting operations are detected; and
    when the priority guidance determination unit determines that two or more categories of said energy wasting operations are detected:
        determine which two or more guidance for energy saving, from among the guidances for energy saving which are stored in said guidance storage unit, correspond to the two or more categories of said energy wasting operations which are detected; and
        determine which among the two or more guidance for energy saving, which are determined to correspond to the two or more categories of said energy wasting operations that are detected, has a most priority so as to be preferentially outputted among the two or more guidances when the two or more categories of said energy wasting operations have a same number of occurrences, wherein a guidance for energy saving for a category of energy wasting operation that has occurred the most times is outputted as a priority when the two or more categories of said energy wasting operations have a different number of occurrences;
    wherein said output control step outputs, by the guidance output device, said guidance for energy saving that has been determined to be outputted as the priority, at said predetermined timing.

2. A guidance output device that outputs guidance for energy saving for a construction machine on which the guidance output device is mounted, the guidance output device receives outputs from a control system of the construction machine, comprising:
    a processor, the processor configured to:
        store, by a guidance storage unit, guidances for energy saving corresponding to a plurality of categories of energy wasting operations with priorities of said guidances;
        detect, by an occurrence detection unit, during an operation of said construction machine on which said guidance output device is mounted, an occurrence of energy wasting operation;
        determine whether the energy wasting operation has continued for at least a predetermined time interval;
        output, by an output control unit, along with a corresponding guidance for energy saving when said energy wasting operation has been detected by said occurrence detection unit, said corresponding guidance for energy saving at a predetermined timing after the occurrence of said energy wasting operation which is detected by said occurrence detection unit, when it is determined that the energy wasting operation continues for at least the predetermined time interval, and wait to output said corresponding guidance until after the energy wasting operation continues for at least the predetermined time interval; and
        determine, by a priority guidance determination unit, whether two or more categories of said energy wasting operations are detected; and
        when the priority guidance determination unit determines that two or more categories of said energy wasting operations are detected:
            determine which two or more guidances for energy saving from among the guidances for energy saving which are stored in said guidance storage unit correspond to the two or more categories of said energy wasting operations which are detected; and
            determine which among the two or more guidances for energy saving, which are determined to correspond to the two or more categories of said energy wasting operations that are detected, has most priority so as to be preferentially outputted among the two or more guidances when the two or more categories of said energy wasting operations have a same number of occurrences, wherein a guidance for energy saving for a category of energy wasting operation that has occurred the most times is outputted as a priority when the two or more categories of said energy wasting operations have a different number of occurrences;
    wherein said output control unit is configured to output said guidance for energy saving that has been determined to be outputted as the priority, at said predetermined timing.

3. A guidance output device according to claim 2, further comprising a measurement unit that measures the number of times, or the frequency, that each of said categories of energy wasting operation has occurred; and wherein said priority guidance determination unit determines the guidance for energy saving that is to be outputted as the priority, on the basis of the number of times, or the frequency, at which each of said categories of energy wasting operation has occurred.

4. A guidance output device according to claim 3, wherein said measurement unit measures the number of times from a predetermined time instant, or the number of times from the turning on of a key that is actuation to turn on the power supply of said construction machine.

5. A guidance output device according to claim 3, further comprising:
   a transmission means that transmits the number of times, or the frequency, that the category of energy wasting operation corresponding to each of said two or more categories of said energy wasting operations has occurred to a management center device; and
   a reception means that receives from said management center device average occurrence information related to the average number of occurrences, or the average frequency of occurrence, of energy wasting operation of construction machines of the same category;
   and wherein said priority guidance determination unit determines said guidance to be outputted as the priority, on the basis of said average occurrence information that has been received, and the number of times, or the frequency, of occurrence of each of said categories of energy wasting operation.

6. A guidance output device according to claim 5, wherein said output control unit compares together said average occurrence information that has been received and the number of times, or the frequency, that each of said categories of energy wasting operation has occurred, and outputs a display or audio that specifies the result of this comparison.

7. A guidance output device according to claim 2, further comprising an operation detection unit that detects ending of working and/or starting of working of said construction machine; and wherein said output control unit outputs said guidance for energy saving upon detection of said ending of working and/or of said starting of working.

8. A guidance output device according to claim 2, further comprising:
   a guidance storage medium that stores, for each operator, operator identification information and guidance for energy saving corresponding to each of said categories of energy wasting operation that have been detected during operation by said operator, in mutual correspondence; and
   an identification information acquisition unit that acquires, from the guidance storage medium, identification information of the operator who performs turning on of a key;
   and wherein said output control unit outputs said guidance for energy saving corresponding to said identification information that has been acquired by said identification information acquisition unit.

9. A guidance output device according to claim 2, wherein, when fault information for a fault in said construction machine is outputted, said output control unit does not output said corresponding guidance for energy saving, even if said energy wasting operation has occurred.

10. A guidance output device according to claim 2, wherein, if said energy wasting operation has not occurred even once, said output control unit outputs a message specifying that operation is good.

11. A guidance output device according to claim 2, wherein:
   said guidance storage unit stores said priority which is predetermined for said energy wasting operation and said guidance for energy saving corresponding to said energy wasting operation,
   said priority guidance determination unit determines said guidance for energy saving according to said priority when two or more categories of said energy wasting operation are detected, and
   said output control unit outputs said guidance for energy saving determined at said predetermined timing.

12. A guidance output device according to claim 2, wherein:
   said guidance for energy saving stored in said guidance storage unit include a first guidance for being outputted when said energy wasting operation occurs and a second guidance for being outputted at a predetermined timing after the occurrence of said energy wasting operation, and said predetermined timing is different from an output timing of said first guidance.

* * * * *